(12) United States Patent
Okada

(10) Patent No.: US 9,470,854 B2
(45) Date of Patent: Oct. 18, 2016

(54) METHOD FOR ASSEMBLING OPTICAL MODULE AND OPTICAL MODULE

(71) Applicant: Sumitomo Electric Device Innovations, Inc., Yokohama-shi (JP)

(72) Inventor: Takeshi Okada, Yokohama (JP)

(73) Assignee: Sumitomo Electric Device Innovations, Inc., Yokohama-shi (JP)

( * ) Notice: Subject to any disclaimer, the term of this patent is extended or adjusted under 35 U.S.C. 154(b) by 44 days.

(21) Appl. No.: 14/403,106

(22) PCT Filed: Jun. 16, 2014

(86) PCT No.: PCT/JP2014/066491
§ 371 (c)(1),
(2) Date: Nov. 21, 2014

(87) PCT Pub. No.: WO2014/204006
PCT Pub. Date: Dec. 24, 2014

(65) Prior Publication Data
US 2016/0139351 A1     May 19, 2016

(30) Foreign Application Priority Data

Jun. 17, 2013    (JP) ................................ 2013-126824

(51) Int. Cl.
*G02B 6/26*           (2006.01)
*G02B 6/42*           (2006.01)
(Continued)

(52) U.S. Cl.
CPC ............. *G02B 6/4227* (2013.01); *G02B 6/32* (2013.01); *G02B 6/4206* (2013.01); *G02B 6/4207* (2013.01); *G02B 6/4225* (2013.01); G02B 6/29362 (2013.01); G02B 6/4246 (2013.01)

(58) Field of Classification Search
CPC .... G02B 6/4227; G02B 6/32; G02B 6/4206; G02B 6/4207; G02B 6/4225
USPC ............................................................. 385/33
See application file for complete search history.

(56) References Cited

U.S. PATENT DOCUMENTS

| | | | | |
|---|---|---|---|---|
| 4,880,289 A | * | 11/1989 | Imoto | G02B 6/2937 385/24 |
| 2002/0012506 A1 | * | 1/2002 | Iizuka | G02B 6/4221 385/91 |

(Continued)

FOREIGN PATENT DOCUMENTS

| | | |
|---|---|---|
| EP | 0 831 350 A2 | 3/1998 |
| JP | H03-192208 A | 8/1991 |

(Continued)

OTHER PUBLICATIONS

Notification of the First Office Action in Chinese Patent Application No. 201480001857.3, dated Sep. 6, 2015.

(Continued)

*Primary Examiner* — Jerry Blevins
(74) *Attorney, Agent, or Firm* — Venable LLP; Michael A. Sartori; Laura G. Remus

(57) ABSTRACT

A method to determine a position of a lens that concentrates an optical beam on an inclined end surface of an optical fiber is disclosed. The method first determines two positions at which optical power output from the lens and measured through a multi-mode fiber becomes a maximum on respective virtual plane apart from the lens; then, calculates the direction or the angle of the optical beam output from the lens, and moves the lens so as to compensate a deviation of the calculated direction from the designed direction.

10 Claims, 9 Drawing Sheets

(51) Int. Cl.
 *G02B 6/32* (2006.01)
 *G02B 6/293* (2006.01)

(56) References Cited

U.S. PATENT DOCUMENTS

2007/0280602 A1 12/2007 Fujimura et al.
2010/0118283 A1* 5/2010 Aizawa ............... G02B 6/4206
 353/100
2011/0297654 A1* 12/2011 Yoshikawa .......... B23K 26/046
 219/121.62

FOREIGN PATENT DOCUMENTS

JP 2010-097177 A 4/2010
WO WO-2004/077629 A1 9/2004

OTHER PUBLICATIONS

International Search Report in PCT International Application No. PCT/JP2014/066491, dated Sep. 15, 2014.
Written Opinion of the International Searching Authority in PCT International Application No. PCT/JP2014/066491, dated Sep. 15, 2014.

* cited by examiner

METHOD FOR ASSEMBLING OPTICAL MODULE AND OPTICAL MODULE

TECHNICAL FIELD

The present application relates to a method to assembly of an optical module that includes a semiconductor laser diode (hereafter denoted as LD), and a lens to couple light emitted from the LD optically with an optical fiber having a tip surface inclined with an optical axis thereof.

An optical module for the optical communication system, for instance, a transmitter optical sub-assembly (hereafter denoted as TOSA) that implements with an optical receptacle generally provides an LD and a lens to couple the light emitted from the LD with an optical fiber secured within the optical receptacle. The LD converts an electrical signal into an optical signal and transmits thus converted optical signal. The lens couples the optical signal derived from the LD with the optical receptacle.

The optical receptacle provides a stub securing a coupling fiber in a center thereof. The coupling fiber and the stub have an end surface inclined with the optical axis of the coupling fiber in order not to reflect light toward the LD. Stray light entering an optical cavity of the LD causes optical noises to degrade the performance of the TOSA.

In order to couple an optical beam with an inclined end surface of an optical fiber by an optimum angle, three members of the LD as an optical source, a concentrating lens, and the optical fiber having the inclined end surface are necessary to be precisely aligned. In particular, when the optical source accompanies with a collimating lens to collimate the divergent optical beam emitted from the LD, which is generally called as the two-lens system, the assembly of the LD and the collimating lens often causes misalignment between them. The optical beam output from the collimating lens inevitably has a substantial angle with respect to the optical axis of the collimating lens as long as the optical axes of the LD and the collimating lens are completely aligned on a single line. Even when such an optical beam with an offset angle from the aligned optical axis is concentrated on the inclined end surface of the optical fiber, the relative position between the optical fiber and the concentrating lens is necessary to further precisely aligned.

SUMMARY OF INVENTION

One aspect of the present application relates to a method to assemble a lens against an LD that emits an optical beam. The lens concentrates the optical beam onto an inclined end surface of an optical fiber. The method includes steps of: (a) determining a first point at which optical power measured through an multi-mode fiber (MMF) becomes a maximum as varying a relative position between the MMF and the lens on a first virtual plane that extends perpendicular to an optical axis of the lens and apart from the lens by a first distance; (b) determining a second point at which optical power measured through the MMF becomes another maximum as varying a relative position between the MMF and the lens on a second virtual plane that extends perpendicular to the optical axis of the lens and apart from the lens by a second distance different from the first distance; (c) calculating a direction of the optical beam output from the lens based on the first point and the second point; and (d) moving the lens relative to the LD such that the calculated direction of the optical beam output from the lens is within a preset range around a designed direction.

BRIEF DESCRIPTION OF DRAWINGS

The foregoing and other purposes, aspects and advantages will be better understood from the following detailed description of a preferred embodiment of the invention with reference to the drawings, in which.

DESCRIPTION OF EMBODIMENTS

Figure 1:
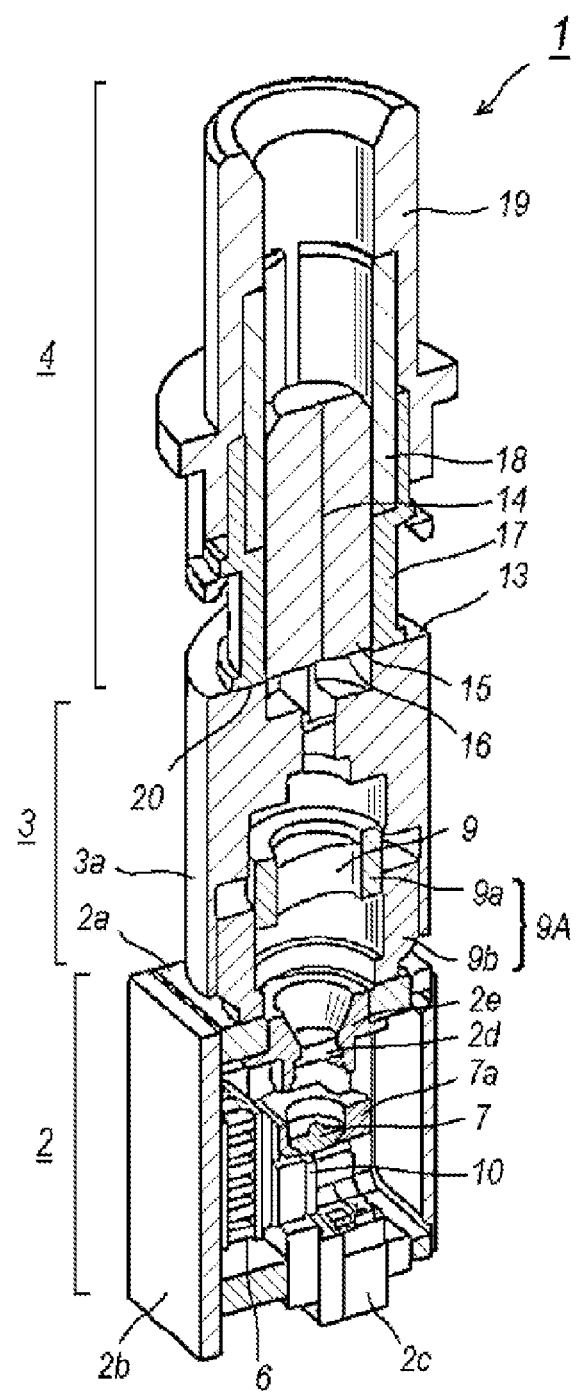
FIG. 1 is a perspective cross sectional view of an optical module according to an embodiment of the invention.

Next, some embodiments according to the present application will be described as referring to drawings. FIG. 1 illustrates an optical module 1 assembled by a method of one embodiment of the invention. The optical module 1 includes an optical device 2 to transmit an optical signal, an optical receptacle 4 for receiving an external fiber, and a joint 3 to couple the optical device 2 with the optical receptacle 4.

The optical device 2, which has a box-shaped package 2a, includes a thermo-electric cooler (hereafter denoted as TEC) 6 on a bottom 2b of the package 2a and an LD 10 on the TEC 6. The TEC 6 also mounts a first lens 7 via a first holder 7a. An electrical signal to drive the LD 10 is provided through electrode 2c formed in a rear of the package 2a, where directions of the rear and the front means that the front is a side on which the optical receptacle 4 is provided, and the rear is a side opposite to the front. The front wall of the package 2a provides a window 2d via a holder 2e to seal an inside of the optical device 2 air-tightly.

The joint 3 includes a second lens 9 secured with a second holder 9A and a cylinder 3a. The second holder 9A includes an outer member 9b fixed to the front wall of the package 2a and an inner member 9a secured within the output member 9b. Moreover, the cylinder 3a receives the second holder 9A with a bore thereof. Overlap of the second holder 9A with the cylinder 3a adjusts a distance between the second lens 9a and an end of a coupling fiber 14 in the optical receptacle 4. The inner member 9a secures the second lens 9, while, the outer member 9b is provided for facilitating the welding with the cylinder 3a. The adjustment of the overlap corresponds to the optical alignment along Z-direction. The cylinder 3a in a relatively thinner skirt portion is welded to the outer member 9b by the piercing welding.

The optical receptacle 4 also has a cylindrical shape with a coupling fiber 14 in a center thereof. The coupling fiber 14, which is a single mode fiber (SMF), has an end surface 16 polished commonly with an end surface of a stub 15 in an angle inclined with respect to an optical axis of thereof. The optical signal is emitted from the LD 10 and concentrated on the end of the coupling fiber 14 by two lenses, 7 and 9, but an optical beam reflected at the end surface of the coupling fiber 14 is suppressed from returning the LD 10. Optical signals returning the LD 10 and entering an optical cavity of the LD 10 causes optical noises and degrades the performance of the LD 10 remarkably.

The stub 15 is press-fitted into a bore of the stub holder 16. The stub holder 16 has a flat and smooth surface 20 facing the joint 3; while, the cylinder 3a of the joint 3 also has a flat and smooth surface 13 facing the optical receptacle 4. The optical alignment on a plane perpendicular to the optical axis, that is, the XY-alignment is carried out by sliding the optical receptacle 14 on the joint 3 as the surface 20 of the stub holder 17 comes in contact with the surface 13 of the cylinder 3a. After the XY-alignment, the stub holder 17 is fixed to the cylinder 3a by the fillet welding at the end thereof to the cylinder 3a. The sleeve 18 is fitted into a space between the stub 15 and the stub holder 17 in a front side of the stub 15. The optical module 1 shown in FIG. 1 installs, what is called, a split sleeve; but another type of a sleeve, namely, a rigid sleeve is applicable to the optical module 1. The stub holder 17 covers a root portion of the sleeve 18, and the cover 18 covers a front portion of the sleeve 18.

Supplying a driving signal to the LD 10 through the electrode 2c, the LD 10 emits the optical signal. The optical signal is converted into a collimating beam by the first lens 7 and concentrated on the end of the coupling fiber 14 by the second lens 9. Thus, the first lens may be called as a collimating lens, while, the second lens may be called as a concentrating lens. The optical module 1 has the arrangement of the optical receptacle where an external optical connector is pluggable with the optical receptacle 4. However, the optical module 1 may have another type of the optical coupling arrangement through a pig-tailed fiber permanently coupled with the optical device 2.

The LD 10, the coupling fiber 14, and the lenses, 7 and 9, require extremely precise alignment for securing satisfactory coupling efficiency between the LD 10 and the coupling fiber 14. Only the passive alignment, which primarily depends on the dimensional accuracy of respective components, does not show enough coupling efficiency. Accordingly, other techniques to obtain an enough coupling efficiency has been practically applied, which is often called as the active alignment between the LD 10 and the second lens 9, that between the coupling fiber 14 in the optical receptacle 4 and an intermediate assembly including the LD 10 and the second lens 9.

Figure 2:
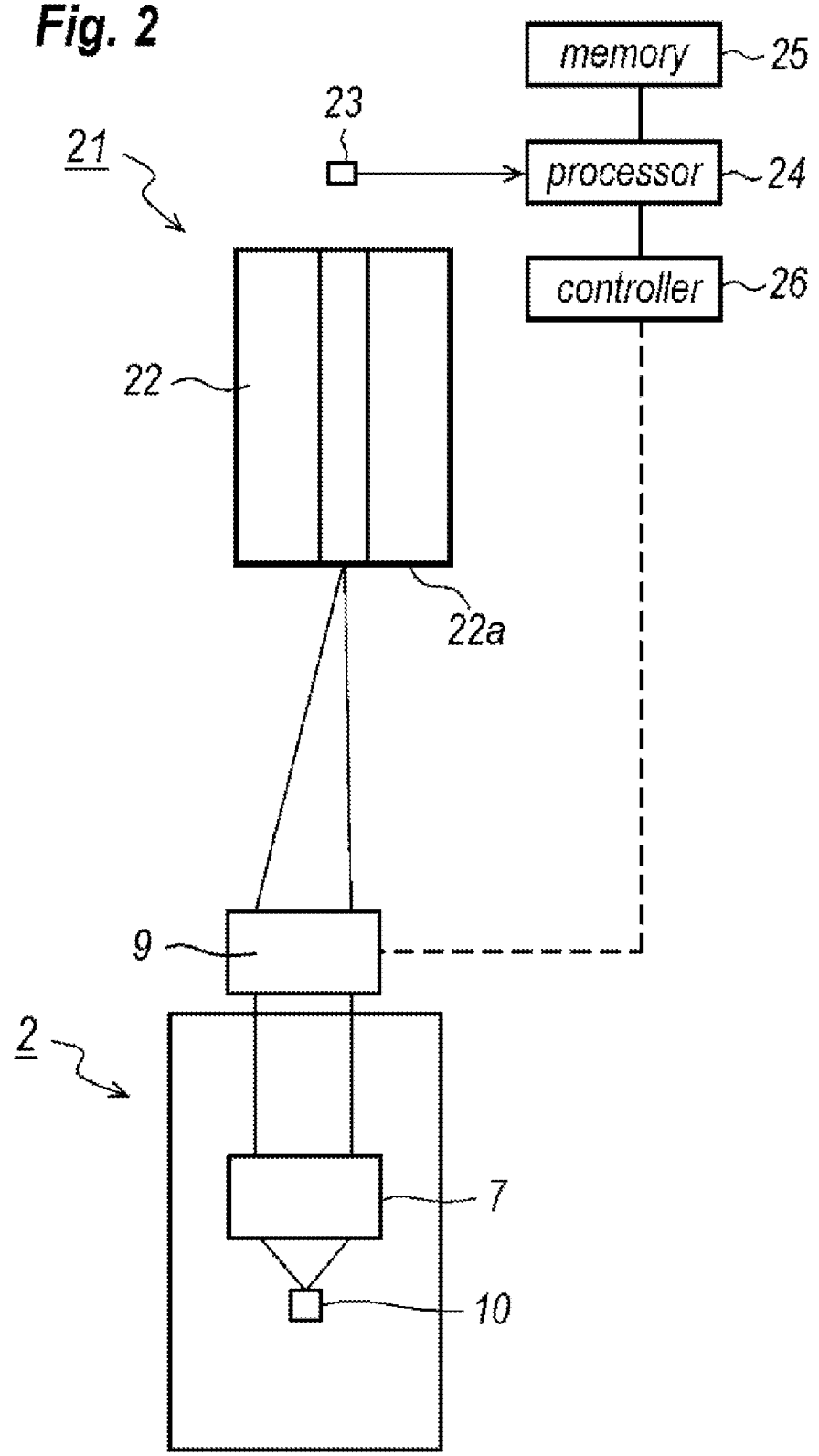
FIG. 2 schematically illustrates a mechanism to determine a second lens against the optical device.

The optical alignment of the second lens 9 will be first described. FIG. 2 schematically illustrates a technique to align the second lens 9 with the optical device 2. The technique shown in FIG. 2 uses, instead of the optical receptacle 4, a receiver tool 21 that includes a multi-mode fiber (hereafter denoted as MMF) 22. An MMF generally has a core with a diameter of around 0.05 mm (50 µm) and an end surface 22a facing the second lens 9. An optical detector 23 detects an optical beam output from an end opposite to the former end 22a; that is, the optical detector 23 detects optical power input to the MMF 22. The optical power thus detected is provided to a processor 24 to be processed by the controller 26. The receiver tool 21 shown in FIG. 2 may provide, in place of the MMF 22, a light-receiving device with the area substantially same as a cross section of the core of the MMF 22 and the sensitivity in a wavelength of light emitted from the LD 10.

The processor 24 determines a position in a virtual plane where the detected optical power becomes a maximum. For instance, the processor 24 determines an angle or an optical axis of the optical beam emitted from the LD 10 by assuming two virtual planes each having a distance from the LD 10 different from the other, and finding positions in respective planes where the optical input power of the MMF 22 becomes an maximum by sliding the MMF 22, exactly the end 22a of the MMF 22, on respective virtual planes. The angle, or the direction of the optical axis, thus obtained is stored in the memory 25. The memory, in addition to thus calculated angle, or the direction, stores the focal length of the second lens 9, a designed distance between the second lens 9 and the coupling fiber 14 in the end surface 16 thereof, a designed angle of the optical beam, and so on. The designed angle, or the designed direction Ltar of the optical beam emitted from the optical device 2, is determined by the inclined angle of the end 16 of the coupling fiber 14 and the refractive index of a material comprising the core of the coupling fiber 14. Entering the optical beam into the core by the designed angle, the optical beam propagates within the core substantially in parallel to the optical axis of the core. When the end of the coupling fiber has no inclined angle with respect to the optical axis thereof, the designed angle becomes 0°; while, the designed angle becomes 2.7° for the inclined angle of 6°, that is, the end surface 16 of the coupling fiber makes the angle of 6° with respect to a plane perpendicular to the optical axis.

The processor 24 calculates an offset of the second lens 9 based on the practical angle of the optical beam practically output from the optical device 2 measured according to the aforementioned steps and the inclined angle of the end surface 16. The offset is temporarily stored in the memory 25 and transferred to the controller 26. The controller 26 adjusts the second lens 9 so as to compensate the offset. The iteration of the measurement of the practical angle of the optical beam and the adjustment of the second lens 9 may define the ideal position of the second lens 9 at which the optical beam output from the second lens 9 makes the designed angle with respect to the inclined surface 16 of the coupling fiber 14.

Figure 3:
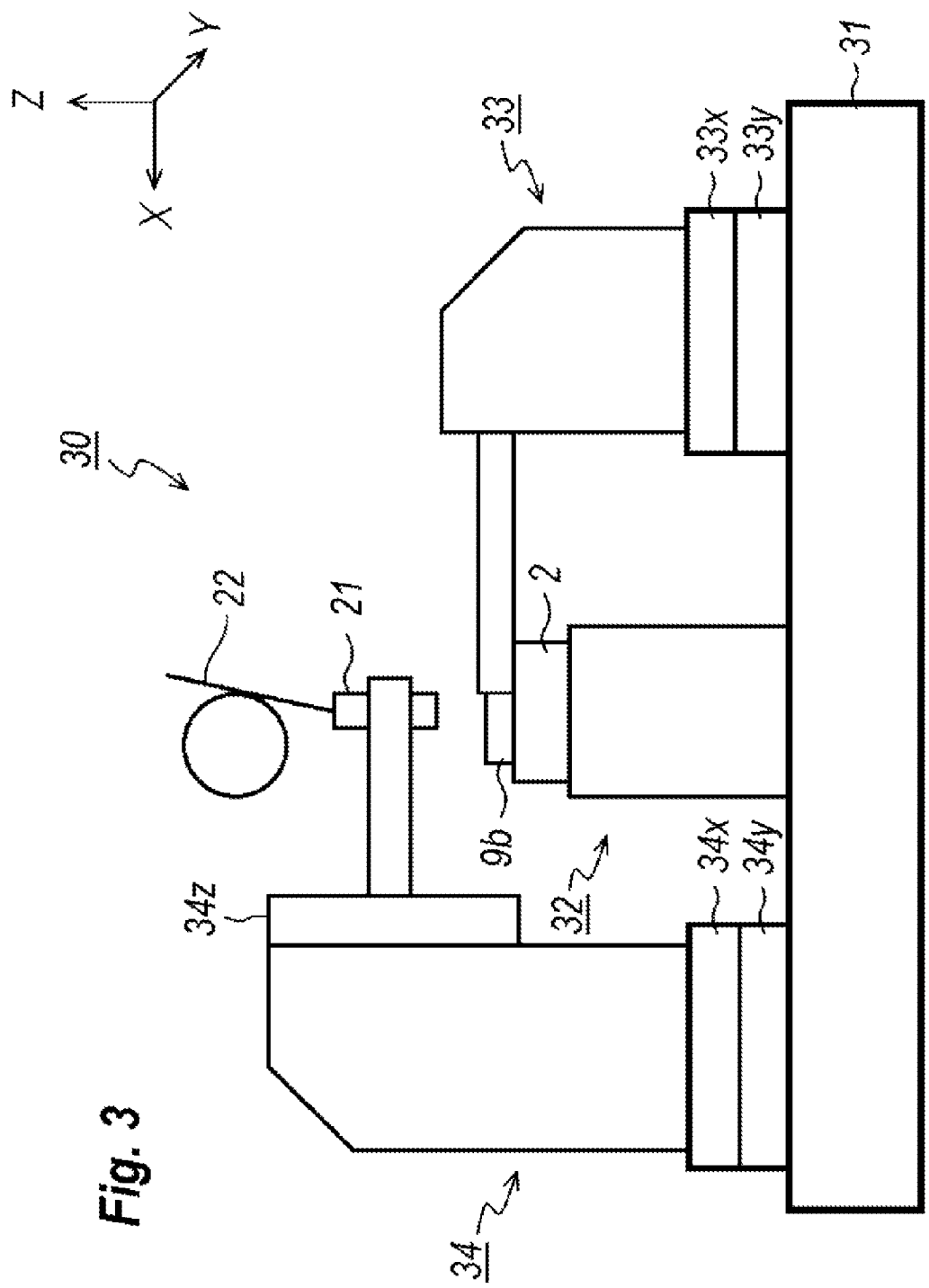
FIG. 3 schematically explains an apparatus to align the second lens against the optical device.
Figure 4:
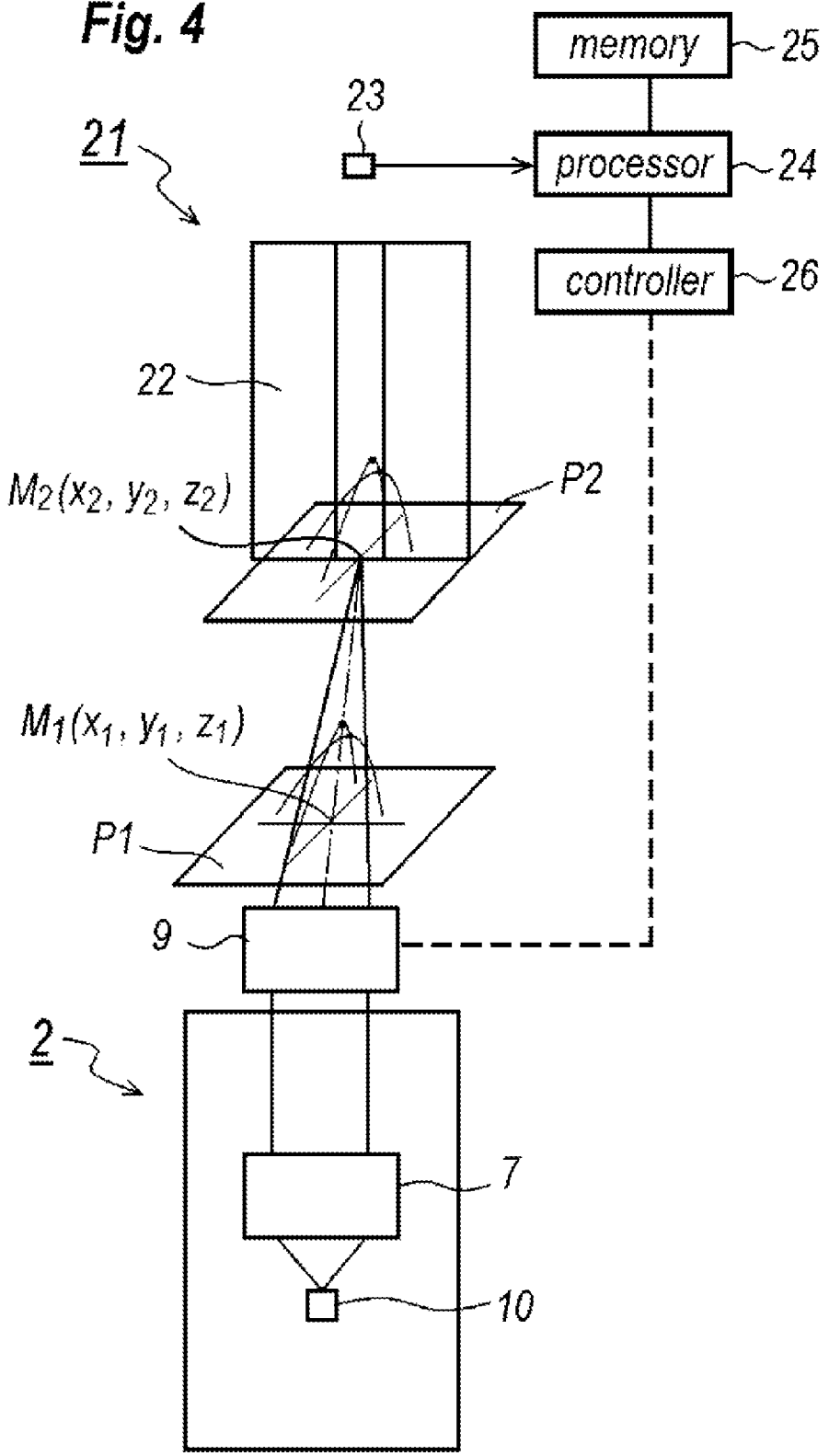
FIG. 4 schematically explains procedures of the method to obtain the direction of the optical beam output from the second lens.
Figure 5A:
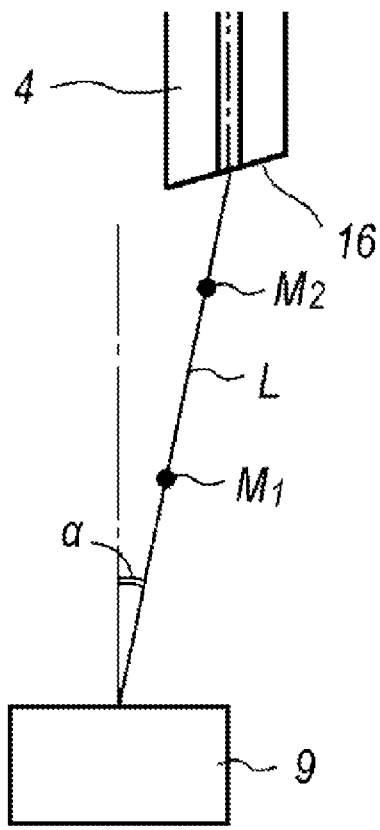
FIGS. 5A and 5B explain to align the practical direction of the optical beam output from the second lens with the target direction.
Figure 5B:
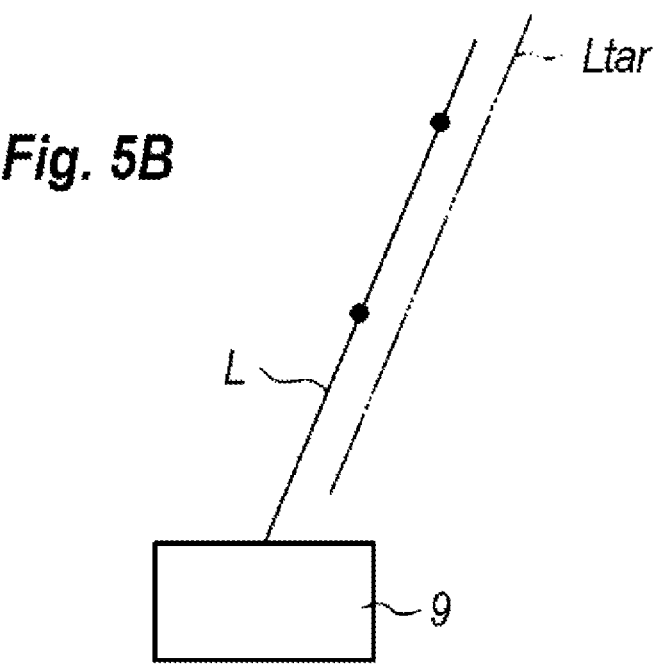

FIGS. 3 to 5 describe the method to determine the position of the second lens in further detail. FIG. 3 schematically illustrates an apparatus 30 applicable to the method above described. The apparatus 30 sets the second holder 9A, the optical device 2, and the receiver tool 21. The first positioner 32 holds the optical device 2, the second positioner 33 holds the second lens 9, and the third positioner 34 holds the receiver tool 21.

The second positioner 33, which provides the X-stage 33x and the Y-stage 33y, holds the outer member 9b of the second holder 9A. The third positioner 34, which provides the X-stage 34x, the Y-stage 34y, and the Z-stage 34z, holds the receiver tool 21. In the apparatus 30, the optical device 2 is tightly fixed to the base 31. The processor 24, as schematically illustrated in FIG. 4, first determines a position $M_1(x_1, y_1, z_1)$ on the first virtual plane P1 at which the optical power detected by the receiver tool 21 becomes a maximum, and another position $M_2(x_2, y_2, z_2)$ on the second virtual plane P2 at which the optical power also becomes a maximum. The processor 24 then determines the direction of the optical beam from the optical device 2 through the second lens 9 by connecting to positions, $M_1$ and $M_2$.

Specifically, the third positioner 34 adjusts the Z stage 34z thereof such that the receiver tool 21 is set in the first virtual plane P1 ($z=z_1$); while, the second positioner 33 sets the outer member 9b of the second holder 9A on the optical device 2. Then, supplying a bias current practically to the LD 10, the receiver tool 21 monitors the optical power output from the MMF 22 as sliding the X stage 34x of the third positioner 34 along the X-direction to determine a position $x_1$ at which the detected optical power becomes a maximum. Subsequently, sliding the Y-stage 34y of the third positioner 34 around this position $x_1$ along the Y-direction, the position $y_1$ where the optical power through the MMF 22 becomes a maximum may be evaluated. Thus, the processor determines the position $(x_1, y_1, z_1)$ at which the optical power output from the MMF 22 becomes the maximum.

Next, the third positioner 34 moves the vertical position of the receiver unit 21 from the first virtual plane P1 ($z=z_1$) to the second virtual plane ($z=z_2$), which is further apart from the second lens 9 in the present embodiment; and procedures similar to those done at the first virtual plane P1 are carried out to determine the second position $(x_2, y_2, z_2)$ at which the monitored optical power output from the MMF 22 becomes a maximum. The processor 24 thus determines two positions, $(x_1, y_1, z_1)$ and $(x_2, y_2, z_2)$. One of features of the method described above is that the receiver tool 21 provides the MMF 22. Because the MMF 22 has relatively wider cross section of the core thereof, the output from the light-receiving device 23 set behind the MMF 22 gradually and continuously varies as the X- and Y-stages slide. Moreover, even when the end of the MMF 22 is offset from the focal length of the second lens 9, the optical power output from the MMF does not drastically decrease, which means that the position at which the optical power output from the MMF 22 becomes a maximum may be determined without any difficulty. On the other hand, a single mode fiber (SMF) has a limited sensitive area for an optical beam entering therein; accordingly, the receiver tool 21 generates a substantial output from the light-receiving device 23 in extremely narrowed positions. In addition, the receiver tool 21 with the SMF outputs an abrupt change as the positions thereof faintly move, which means that the determination of the position at which the optical output becomes a maximum is hard.

The method described to determine the position $(x_i, y_i)$ to give the maximum optical output slides the receiver tool 21 only once along the X- and Y-directions, respectively. That is, the method first determines the x-position $x_1$, then obtains the y-position $y_1$ by sliding the tool 21 along the Y-direction, where this method is often called as the cross alignment, and enables the precise alignment. However, further alignment along the X- and Y-directions may be carried out until the maximum optical power converges. Specifically, another x-alignment is carried out to determine the next x-position x' where the optical output power becomes a maximum around the position $y_1$, and another y-alignment to determine the next y-position $y_1$' around the newly obtained x-position $x_1$'. The procedures thus described are carried out until the optical output obtained at the position $(x_i', y_i')$ substantially equal to the optical output power obtained at the position $(x_{i-1}, y_{i-1})$. The position (x, y) at which the optical power output from the MMF 21 may be thus determined by the iteration. The iteration of the cross alignment may further enhance the accuracy of the position to obtain the maximum output power, and resultantly the direction of the optical beam output from the LD 10 and passing through the second lens 9.

The processor determines the direction, or the angle, of the optical beam output from the optical device 2 and passing through the second lens 9 from two positions, $M_1(x_1, y_1, z_1)$ and $M_2(x_2, y_2, z_2)$. The direction of the optical beam may be calculated from the line connecting these two points, or the linear approximation by three points including above two points, $M_1$ and $M_2$, and the origin (0, 0, 0) at which the optical device 2 outputs the light. In an alternative, the linear approximation of two points, $M_1$ and $M_2$, for a line passing the origin (0, 0, 0) may be applicable to determine the direction and the angle of the optical axis of the light emitted from the optical device 2 and passing the second lens 9.

Next, the processor 24 evaluates a deviation of the practical angle α or the direction of the optical beam thus calculated from that of the designed one Ltar, which is determined from the angle of the inclined end surface 16 and the material of the core of the coupling fiber 14, as illustrated in FIG. 5. When the angle α practically measured is not within a preset range around the angle of the designed direction Ltar, the processor 24 calculates a deviation thereof and an amount of the slide of the second lens, and transfers the sliding amount to the second positioner 33 through the controller 26. The compensating amount, Δx and Δy, may be evaluated by equations below:

$$\Delta x = f \times (\tan(\theta x) - \tan(\theta tx)), \text{ and}$$

$$\Delta y = f \times (\tan(\theta y) - \tan(\theta ty)),$$

where f is a focal length of the second lens 9, (θtx, θty) are the designed angle of the optical beam Ltar, (θx, θy) are the angles practically measured by the method described above, and (Δx, Δy) are the compensating amounts of the second lens 9.

The second positioner 33, receiving the compensating amount, Δx and Δy, from the controller 26, slides the second lens 9 through the outer member 9b. The second positioner 33 keeps the z-position during this slide by the end surface of the optical device 2 as the reference. The method further determines the positions to give the maximum optical power at respective virtual planes, P1 and P2, and calculates the practical angle of the optical beam passing the second lens 9. The faint adjustment of the position of the second lens 9 is iterated until the angle of the optical beam becomes within a present range around the designed angle.

The method thus described measures the optical output power at two distances between the MMF 22 and the second lens 9, namely, at the first and second virtual planes, P1 and P2. The MMF 22 is unnecessary to be finely slid along the axis of the second lens 9 to determine the maximum coupling efficiency with respect to the coupling fiber 14. The method may only shorten the tact time even for the two-lens optical system where misalignment often occurs.

The method described above fixes the optical device 2 to the base 31, and the second lens 9 to the optical device 2; while, the method slides the receiver tool 21 along three directions, X, Y, and Z, to find the position where the maximum optical power is obtained. Thus, a positioner capable of sliding along three directions easily performs the process. However, such a positioner having three movable stages, 34x to 34z, needs complicated mechanisms. Moreover, the Z-stage 34z is not ignored to slide during the operation of the other two stages, 34x and 34y.

Figure 6:
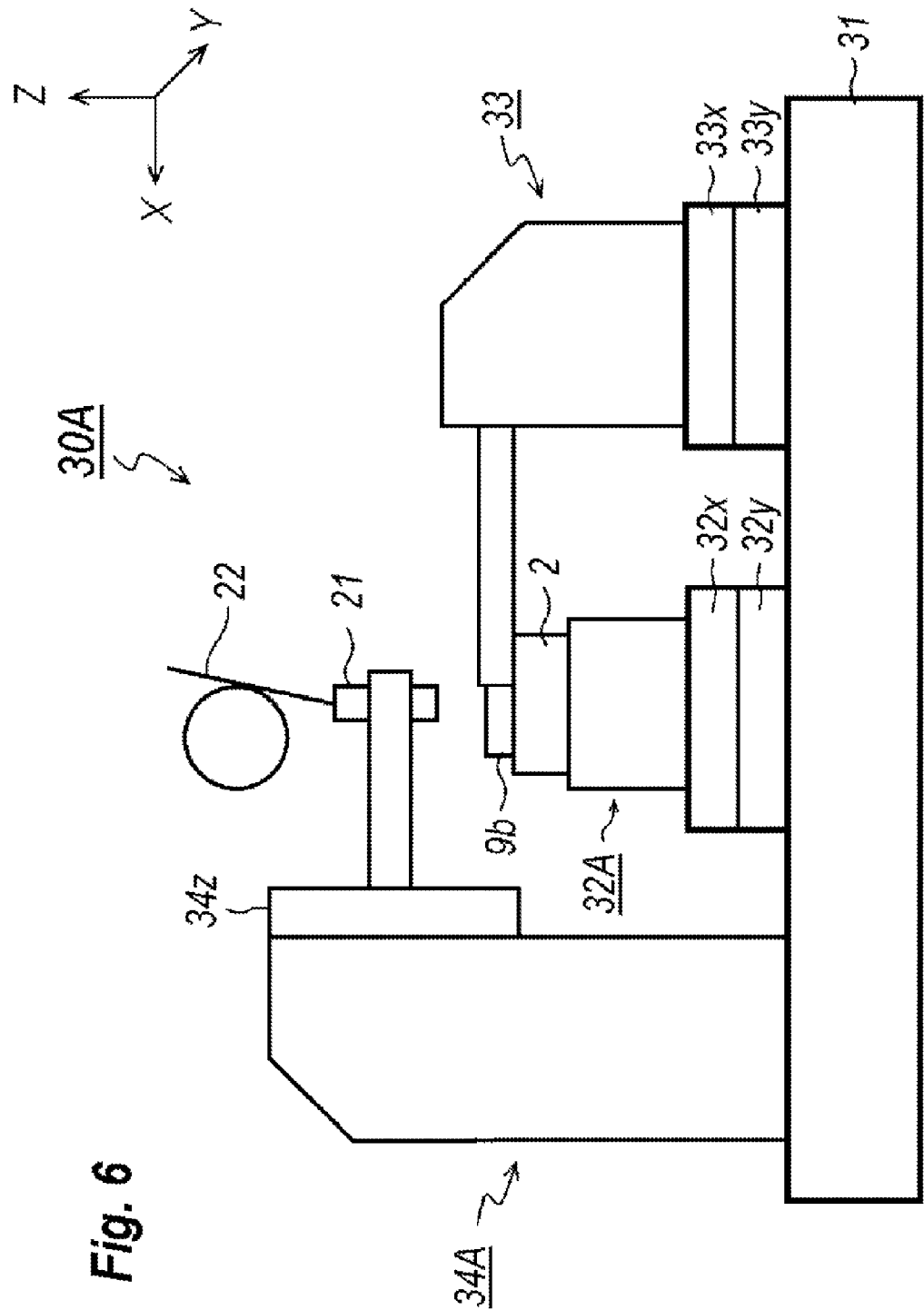
FIG. 6 schematically explains another apparatus to align the second lens against the optical device.

FIG. 6 schematically illustrates another type of the apparatus 30A applicable to the method to align the second lens 9. The apparatus 30A in FIG. 6 has a feature distinguishable from the aforementioned apparatus 30 that the third positioner 34A provides only the z-stage 34z, while, the first positioner 32A provides two stages, namely, the x-stage 32x and the y-stage 32y.

The method to align the second lens 9 by the modified apparatus 30A is substantially same with those using the former apparatus 30. That is, the XY alignment to find the position at which the maximum output power is obtained is carried out on two virtual planes, P1 and P2, each having a distance from the second lens 9 different from the other. Then, the direction or the angle of the optical beam passing the second lens 9 is calculated based on thus determined two points, or three points including the origin. The modified apparatus 30A performs the XY alignment by the first positioner 32A, not the third positioner 34 in the aforementioned embodiment.

A positioner movable only in two stages, X and Y, generally has a mechanism simpler than a three-stage positioner. The positions of two stages, 32x and 32y, of the first positioner 32A where the receiver tool 21 detects maximum optical power at respective distances from the second lens 9 are easily evaluated by sliding two stages, 32x and 32y, of the first positioner 32A. Thus, the direction of the optical beam passing the second lens 9 may be calculated based on thus obtained two points, $M_1'(x_1, y_1, z_1)$ and $M_2'(x_2, y_2, z_2)$.

The method iterates operations to slide the first positioner 32A and the third positioner 34A until the direction or the angle of the optical beam passing the second lens 9 thus obtained is within a preset range around the designed angle. Then, the second lens 9 is welded by, for instance, the YAG-laser welding to the front wall 2a of the optical device 2 through two members, 9a and 9b.

Figure 7:
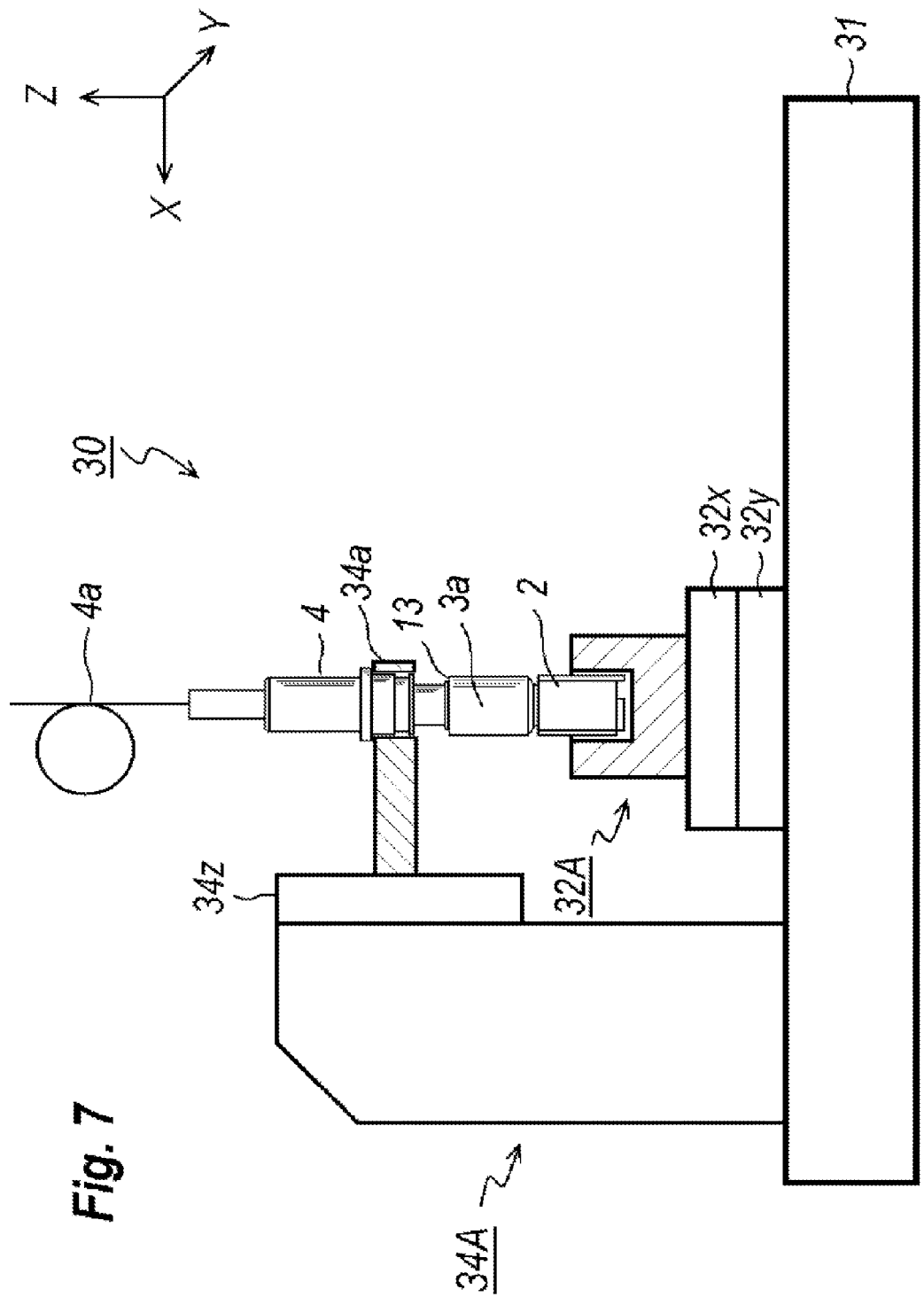
FIG. 7 explains procedures to assemble the optical receptacle with the optical device.

FIG. 7 schematically illustrates a process subsequent to the process above described. The process shown in FIG. 7 fixes the optical receptacle 4 with the optical device 2. That is, the process replaces the receiver tool 21 with the optical receptacle 4 that provides a dummy fiber 4a within the sleeve 18, and the alignment of the optical receptacle 4 is carried out as monitoring an optical beam output from the dummy fiber 4a. Specifically, inserting the outer member 9b, which holds the second lens 9, into a bore of the cylinder 3a of the joint 3, and setting the optical receptacle 4 on the end surface 13 of the joint 3 by adjusting the Z-stage 34z of the third positioner 34A that supports the optical receptacle 4; then, when the modified apparatus 30A is applied, the first positioner 32A adjusts the relative position of the optical receptacle 4 against an assembly of the joint 3 with the optical device 2 by sliding the X- and Y-stages, 32x and 32y, of the first positioner 32A. That is, the coupling fiber 14 in the end surface thereof is aligned with the axis of the optical beam passing the second lens 9 by sliding the optical receptacle 4 on the end surface 13 of the joint 3.

Subsequently, the Z-alignment between the optical receptacle 4 and the joint 3 is carried out. Specifically, because the cylinder 3a receives the outer member 9b of the second holder 9A within the bore thereof, the slide of the X- and Y-stages, 32x and 32y, of the first positioner 32A automatically moves the joint 3. Although a faint gap exists between the outer surface of the outer member 9b and the bore of the cylinder 3a, this gap causes substantially no effect of the alignment procedures. The optical receptacle 4 is supported and held by a chuck 34a provided in an end of the supporting arm of the third positioner 34A. The chuck may be made of material causing a magnetic force, while, the joint 3 is made of stainless steel. Sliding the Z-stage 34z of the third positioner 34A to lift the optical receptacle 4 up and down, the joint 3 also moves up and down by the magnetic force by the chuck 34a. Thus, the slide of the third positioner 34A may adjust an overlap length between the cylinder 3a and the outer member 9b of the second holder 9A. When the third positioner 34A supports the joint 3, the third positioner 34A needs to slide along the X- and Y-directions such that the optical device 2 with the joint 3 is aligned in the X- and Y-directions against the optical receptacle 4. Such a motion of the joint 3 and the optical device 2 requires a complex mechanism in the third positioner 34A. For instance, the third positioner 34A is placed on the x- and y-stages, 32x and 32y, of the first positioner 32A. The mechanism utilizing the magnetic force of the chuck 34a makes it possible to install the first and third positioners, 32A and 34A, with an ordinary mechanism.

The iteration of the XY alignment by the first positioner 32A and the Z alignment by the third positioner 34A determines the position of the optical receptacle 4 relative to the joint 3 and the optical device 2. After the whole alignment, the optical receptacle 4 in the end flange thereof is welded to the end surface 13 of the cylinder 3a in a form of the fillet welding.

Figure 8:
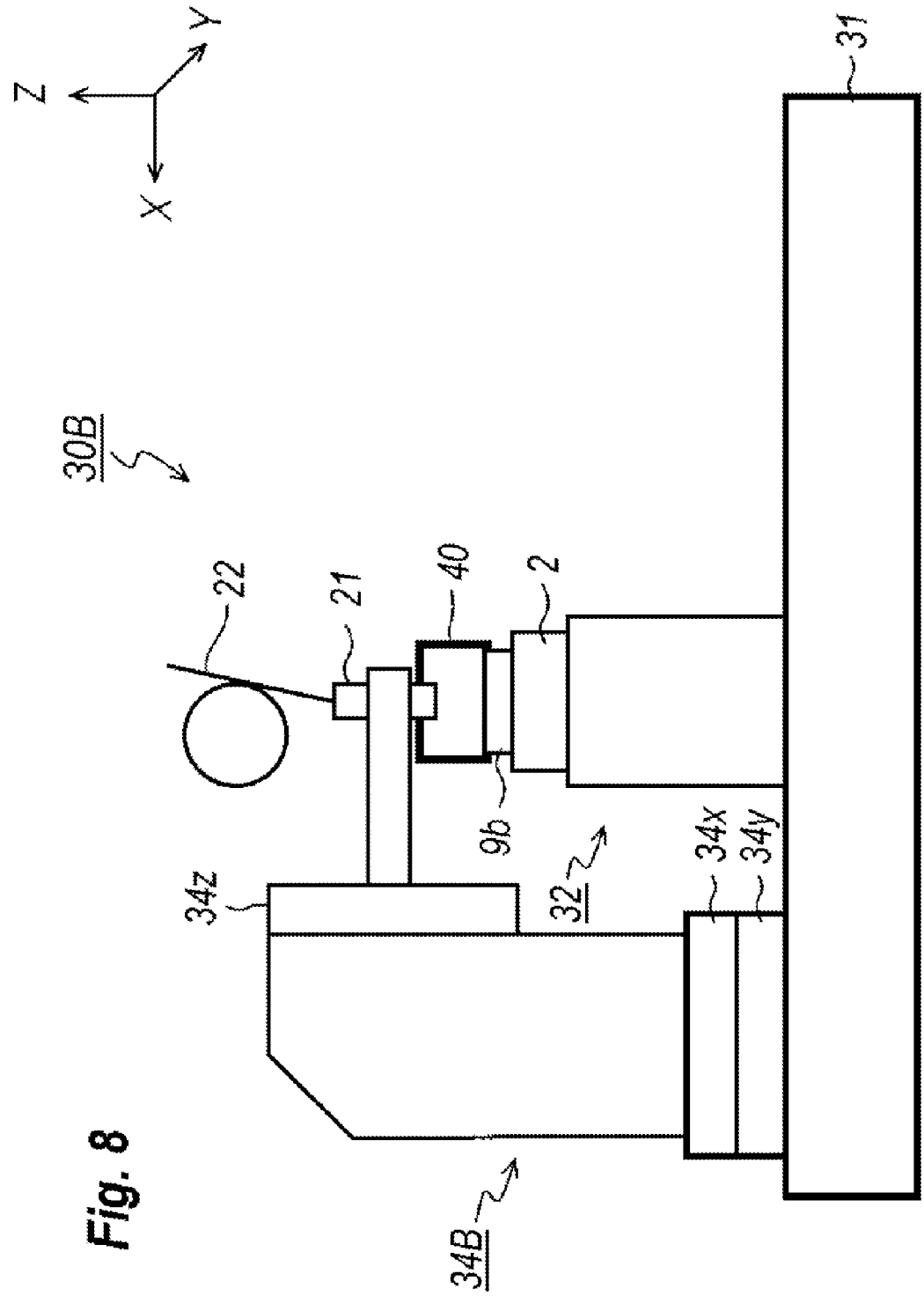
FIG. 8 schematically explains a still another apparatus to align the optical receptacle with the optical device.
Figure 9:
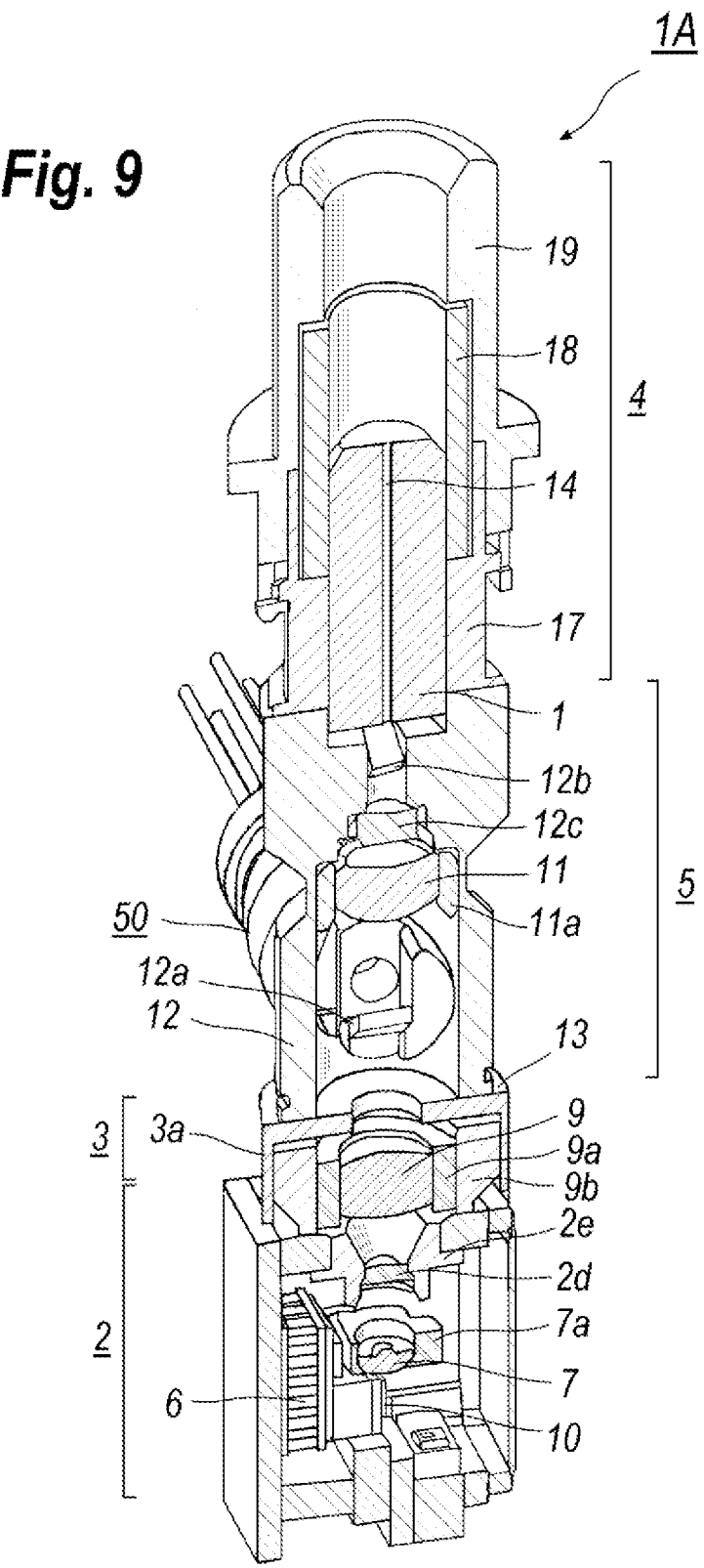
FIG. 9 is a perspective cross section of another optical module.

Another modified embodiment of the apparatus 30B shown in FIG. 8 omits the second positioner 33 for the second lens 9. The modified apparatus 30C shown in FIG. 9 provides the third positioner 34B with a cap 40 in an end of the arm thereof. The cap 40 fully covers the outer member 9b of the second holder 9A and slides the outer member 9b by pressing the outer surface of the member 9b with the inner surface of the cap 40, which may slide the outer member 9b. The process to move the second lens 9 to a compensated direction by a calculated amount under the control of the controller 26 is unnecessary to slide the receiver tool 21. Accordingly, the apparatus 30C utilizes the third positioner 34B. That is, after the determination of the two positions, $M_1(x_1, y_1, z_1)$ and $M_2(x_2, y_2, z_2)$; the z-stage 34z descends to grasp or cover the outer member 9b. Then, based on the feed-back from the controller 26, the third positioner 34B slightly and horizontally moves the second lens 9.

Thus, the apparatus 30B is unnecessary to prepare the second positioner 33 for holding and moving the second lens 9. Although the apparatus 30B is based on the apparatus 30 of the first embodiment shown in FIG. 3 where the third positioner 34B provides three stages, X-, Y- and Z-stages, 34x to 34z; the apparatus 30B may follow the arrangement of the second apparatus 30A shown in FIG. 6, that is, the third positioner 34 provides only the z-stage 34z, while, the first stage 32 is movable along the X- and Y-direction by two movable stages, 32x and 32y.

The optical module 1 thus described has the optical receptacle 4 to receive an external optical connector optically coupled with the optical device 2. However, the assembling method of the embodiments is not restricted to those optical modules with the optical receptacle and is applicable to another type of an optical module, what is called, the module with a pig-tailed fiber without any modifications or adjustments.

FIG. 9 is a cross sectional view of still another type of an optical module 1A, where the optical module 1A, in addition to the optical device 2 shown in FIG. 1, provides another optical device 50, the second optical device, and the third optical device which is not illustrated in FIG. 9. This type of the optical module 1A is generally called as the tri-plexer. The optical module 1A further provides an optical functional block 5 between the optical receptacle 4 and the joint 3. The second optical device 50 and third optical device are assembled to the functional block 5. The functional block 5 installs the first wavelength selective filter 12a, the third lens 11 set in the third holder 11a, an optical isolator 12c, and the second wavelength selective filter 12b. The third lens 11 and the optical isolator 12c are rigidly fixed to the housing 12 of the functional block 5; accordingly, the functional block 5 has no mechanism to align optical device 50 and optical components.

The optical devices, 2 and 50, are transmitter optical subassemblies each installing an LD therein. Each of LDs in respective TOSAs, 2 and 50, emits light with a specific wavelength different from the other. The optical signal output from the LD 10 in the optical device 2 passes the first and second lenses, 7 and 9, and enters the coupling fiber 14. The optical beam output from the optical assembly passes the lens provided in the optical output port of the optical device 50, bends the optical axis thereof about 90° by the first wavelength filter 12a, passes the third lens 12c, and finally enters the end of the coupling fiber 14. The first wavelength filter 12a transmits the optical beam output from the optical device 2 but reflects the other optical beam output from the second optical device 50.

The third optical device not explicitly appearing in FIG. 9 is a type of the receiver optical subassembly (ROSA) installing a photodiode therein to convert an external optical signal into an electrical signal. That is, the external optical beam output from the end of the coupling fiber 14 is reflected by the second wavelength filter 12b and enters the ROSA. The second wavelength filter 12b transmits optical beams coming from the TOSAs, 2 and 50, but reflects the optical beam from the coupling fiber 14. The optical isolator 12c passes the optical beams propagating toward the coupling fiber 14 but cuts optical beams reversely propagating toward the second lens 11.

The LD 10 emits a divergent optical beam toward the first lens 7, and the first lens 7 converts the divergent optical beam into a collimated optical beam. The optical module 1A provides the functional block 5 between the optical receptacle 4 and the optical device 2, which lengthens the optical path from the first lens 7 to the coupling fiber 14. In such an arrangement, the offset of the optical axes between the optical receptacle 4 and the optical device 2 increases at the inclined end surface of the coupling fiber 14. Accordingly, the optical module 1A provides the third lens 11 between the second lens 9 and the coupling fiber 14.

That is, the coupling fiber 14 in the end thereof is aligned with one of the focal points of the third lens 11, while, the other focal points of the third lens 11 is aligned with the focal point of the second lens 9; then, viewing from the second lens 9, the focal point of the third lens 11 close to the second lens 9 may regard as the inclined end surface of the coupling fiber 14. Thus, the second lens 9 is aligned with respect to the optical device 2 by the method described above, the optical alignment between the optical device 2, the second lens 9, the third lens 11, and the coupling fiber 14 is carried out.

The second optical device 50, which provides a lens in the output port thereof, may emit a collimated optical beam. This collimated beams from the second optical device 50 is reflected by the first wavelength filter 12a, enters the third lens 11 to be focused on the end surface of the coupling fiber 14. When a collimated optical beam enters a convex lens, the optical beam is concentrated on the focal point of this lens. Thus, the optical module 1A couples the optical device 2 with the coupling fiber by the triple lens system, while, the second optical device 50 optically couples with the coupling fiber by the dual lens system. Even in such a complex optical coupling arrangement, the method of the embodiments easily obtains the direction of the optical beam output from the second lens 9.

In the foregoing description, the method of the present invention has been described with reference to specific exemplary embodiments thereof. However, it will be evident that various modifications and changes may be made thereto without departing from the broader spirit and scope of the present invention. The present specification and figures are accordingly to be regarded as illustrative rather than restrictive.

The invention claimed is:

1. A method of assembling a lens against a semiconductor laser diode (LD) that emits an optical beam, the lens concentrating the optical beam onto an inclined end surface of an optical fiber, the method comprising steps of:
   replacing the optical fiber with a multi-mode fiber (MMF);
   determining a first point on a first virtual plane as varying a relative position between the MMF and the lens, at which optical power measured through the MMF becomes a maximum, the first virtual plane extending perpendicular to an optical axis of the lens and being apart from the lens by a first distance;
   determining a second point on a second virtual plane as varying a relative position between the MMF and the lens, at which optical power measured through the MMF becomes another maximum, the second virtual plane extending perpendicular to the optical axis of the lens and being apart from the lens by a second distance different from the first distance;
   calculating a direction of the optical beam output from the lens based on the first point and the second point; and
   moving the lens relative to the LD such that the calculated direction of the optical beam output from the lens is within a preset range around a designed direction,
   wherein the steps of determining the first point and the second point include steps of:
   on the first virtual plane and the second virtual plane, obtaining initial points at which the optical power measured through the MMF becomes respective maxima as varying the relative positions between the MMF and the lens along a first direction;
   obtaining subsequent points at which the optical power measured through the MMF becomes other respective maxima as varying relative positions between the MMF and the lens along a second direction perpendicular to the first direction from the respective initial points; and
   setting the subsequent point obtained in the first virtual plane as the first point and the subsequent point obtained in the second virtual plane as the second point.

2. The method of claim 1,
   wherein the lens includes a collimating lens that collimates the optical beam emitted from the LD, and a concentrating lens that concentrates the collimated optical beam onto the inclined end surface of the optical fiber,
   wherein the first distance and the second distance are measured from the concentrating lens, and
   wherein the step of moving the lens includes a step of moving the concentrating lens relative to the collimating lens.

3. The method of claim 2,
   wherein the lens further includes another lens between the concentrating lens and the inclined end surface of the optical fiber, the another lens having a focal point positioned on the inclined end surface of the optical fiber,
   wherein the step of moving the lens includes a step of moving the concentrating lens such that the concentrating lens aligns a focal point in a side of the another lens with another focal point of the another lens.

4. The method of claim 1,
   further including steps of, before the step of setting the first point and the second point, iterating the steps of obtaining the initial points and the subsequent points until the initial points and the subsequent points become substantially equal to each other in respective virtual planes, and setting the subsequent point obtained in the first virtual plane as the first point and the subsequent point obtained in the second virtual plane as the second point.

5. The method of claim 1, wherein the step of determining the first point includes a step of moving the MFF in the first virtual plane as fixing the lens, and the step of determining the second point includes a step of moving the MFF in the second virtual plane as fixing the lens.

6. The method of claim 1, wherein the step of determining the first point includes a step of moving the lens in a plane parallel to the first virtual plane as fixing the MMF, and the step of determining the first point and the second point includes a step of moving the lens in a plane parallel to the second virtual plane as fixing the MMF.

7. The method of claim 1, wherein the step of calculating the direction of the optical beam is carried out based on the first point, the second point and a position of the lens.

8. The method of claim 7, wherein the step of calculating the direction of the lens is carried out by a linear approximation using the first point, the second point and the position of the lens.

9. The method of claim 7, wherein the step of calculating the direction of the lens is carried out by a linear approximation of the first point and the second point for a line passing the position of the lens.

10. The method of claim 1, further including steps of:

replacing the MMF with the optical fiber after the step of moving the lens; and aligning the inclined end surface of the optical fiber with the lens by moving the inclined end surface in a plane perpendicular to the optical axis of the lens and moving along the optical axis.

* * * * *